United States Patent
Yamashita

(10) Patent No.: US 8,004,571 B2
(45) Date of Patent: Aug. 23, 2011

(54) PROJECTION-BASED SYSTEM, APPARATUS AND PROGRAM OF STORING ANNOTATED OBJECT IMAGE

(75) Inventor: Akio Yamashita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 505 days.

(21) Appl. No.: 12/134,491

(22) Filed: Jun. 6, 2008

(65) Prior Publication Data

US 2009/0096909 A1  Apr. 16, 2009

(30) Foreign Application Priority Data

Oct. 10, 2007  (JP) ................................. 2007-264363

(51) Int. Cl.
*H04N 5/232* (2006.01)
*H04N 9/31* (2006.01)
*G03B 21/26* (2006.01)

(52) U.S. Cl. ...................... 348/211.12; 348/745; 353/28

(58) Field of Classification Search .... 348/14.08–14.12, 348/211.12, 744–745; 353/28, 121
See application file for complete search history.

(56) References Cited

U.S. PATENT DOCUMENTS

| | | | | |
|---|---|---|---|---|
| 5,434,617 A | * | 7/1995 | Bianchi | 348/170 |
| 6,392,694 B1 | * | 5/2002 | Bianchi | 348/169 |
| 6,654,060 B1 | * | 11/2003 | Kurosawa et al. | 348/333.02 |
| 7,391,482 B2 | * | 6/2008 | Belhveau | 348/795 |
| 7,468,742 B2 | * | 12/2008 | Ahn et al. | 348/207.99 |
| 2004/0070674 A1 | | 4/2004 | Foote et al. | |
| 2006/0290786 A1 | * | 12/2006 | Tokai | 348/211.99 |

FOREIGN PATENT DOCUMENTS

JP  2005-33756 A  2/2005

* cited by examiner

*Primary Examiner* — Lin Ye
*Assistant Examiner* — Carramah J Quiett
(74) *Attorney, Agent, or Firm* — Sughrue Mion, PLLC

(57) ABSTRACT

An information processing apparatus is connected to a projection device and an image capture device, and includes an acquiring portion, a detecting portion, and a controller. The acquiring portion acquires images captured by the image capture device. The detecting portion detects positions of the object and a user of the information processing apparatus from the captured images. The controller causes the projection device to project a first indication data indicating storage of at least one of the captured images onto an area except for a linear area linking the user of the information processing apparatus to the object and existing between the user of the information processing apparatus and the object, based on the detected positions of the object and the user of the information processing apparatus, and stores the at least one of the captured images in a memory when the projected first indication data has been interrupted.

8 Claims, 16 Drawing Sheets file name: collabo000
start time: 200x.05.30 13:50
end time: 200x.05.30 14:00
sound file: collabo_s000
sound level: 3 file name: collabo008
start time: 200x.05.30 14:00
end time: 200x.05.30 14:02
sound file: collabo_s008
sound level: 3 file name: collabo009
start time: 200x.05.30 14:02
end time: 200x.05.30 14:01
sound file: collabo_s009
sound level: 5

PROJECTION-BASED SYSTEM, APPARATUS AND PROGRAM OF STORING ANNOTATED OBJECT IMAGE

CROSS-REFERENCE TO RELATED APPLICATION

This application is based on and claims priority under 35 USC 119 from Japanese Patent Application No. 2007-264363 filed Oct. 10, 2007.

BACKGROUND

1. Technical Field

This invention relates to an information processing apparatus, a remote indication system, and a computer readable medium.

2. Related Art

There has been conventionally known a remote indication system including a server (e.g. a computer) with which a camera and a projector are connected, and a client (e.g. a computer) of a remote place connected with the server via a network.

SUMMARY

According to an aspect of the present invention, there is provided an information processing apparatus which is connected to a projection device projecting an annotation image input from an external terminal onto a projection area including an object, and an image capture device capturing the projection area, including: an acquiring portion that acquires a plurality of images captured by the image capture device; a detecting portion that detects positions of the object and a user of the information processing apparatus from the plurality of images; a controller that causes the projection device to project a first indication data indicating storage of at least one of the captured images onto an area except for a linear area linking the user of the information processing apparatus to the object and existing between the user of the information processing apparatus and the object, based on the detected positions of the object and the information processing apparatus, and stores the at least one of the captured images in a memory when the first indication data projected by the projection device has been interrupted.

BRIEF DESCRIPTION OF THE DRAWINGS

Exemplary embodiments of the present invention will be described in detail based on the following figures, wherein.

DETAILED DESCRIPTION

A description will now be given, with reference to the accompanying drawings, of exemplary embodiments of the present invention.

First Exemplary Embodiment

Figure 1:
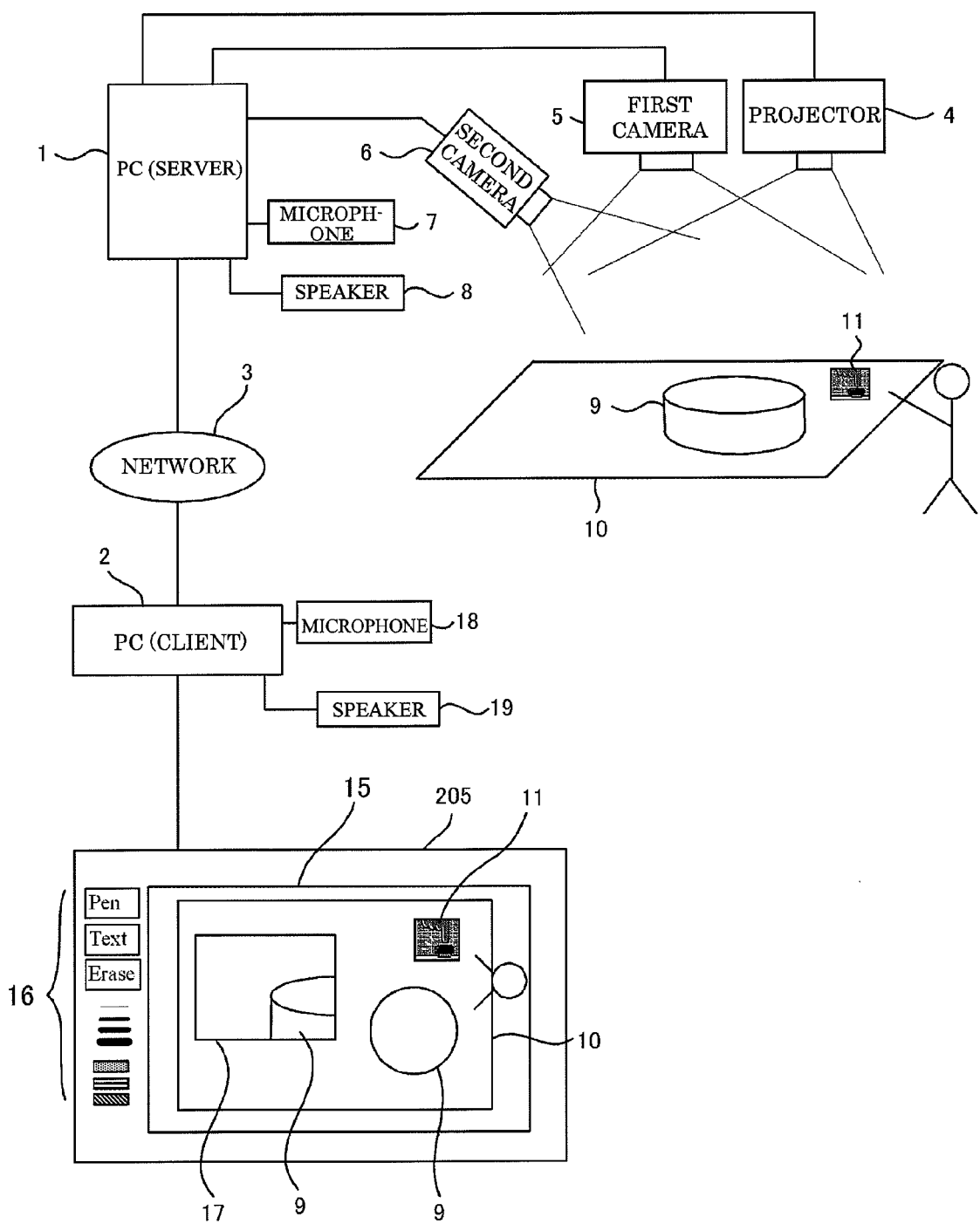
FIG. 1 is a block diagram showing the structure of a remote indication system in accordance with a first exemplary embodiment of the present invention.

FIG. 1 is a block diagram showing the structure of a remote indication system in accordance with a first exemplary embodiment of the present invention.

The remote indication system is provided with a personal computer (PC) 1 functioning as a server, and a personal computer (PC) 2 functioning as a client. These elements are connected to each other via a network 3. A projector 4 (a projection device), a first camera 5 (an image capture device), a second camera 6 (an image capture device), a microphone 7 (input portion) and a speaker 8 (output portion) are connected to the PC 1. Based on a control command from the PC 1, the projector 4 emits light beams or projects an annotation image or the like onto an object 9 placed on a table 10. It should be noted that the annotation image includes an image of any types such as a line, a character, a symbol, a figure, a color, and a font. Moreover, the projector 4 projects a storing button 11 for storing a captured image in the PC 1 onto the table 10 based on a control command from the PC 1.

The first camera 5 captures a reflected image of the table 10 including the object 9, and outputs the captured image to the PC 1. That is, the first camera 5 captures a whole image of the object 9. The first camera 5 is arranged so that an angle of view and an optical axis of the first camera 5 are identical with those of the projector 4.

The second camera 6 is composed of a network camera, a PTZ (Pan-Tilt-Zoom) camera, or a portable camera. A user of the PC 1 side can move the second camera 6 freely. The second camera 6 is used to capture a part of the object 9 (e.g. the part which becomes an invisible shadow from the front of the object 9) which cannot be captured by the first camera 5, and capture the object 9 in a closeup mode. That is, the second camera 6 captures a part of the object 9.

The microphone 7 inputs voice such as indication of the user of the PC 1, and outputs the voice to a speaker 19 connected to the PC 2. The speaker 8 outputs voice such as indication of a user of the PC 2 input from a microphone 18 connected to the PC 2.

The PC 1 outputs images which are captured by the first camera 5 and the second camera 6 to the PC 2 via the network 3. The PC 2 is connected to a display unit 205, the microphone 18 and the speaker 19. The display unit 205 displays a display area 15 of the captured image and a user interface (UI) 16. It should be noted that the PC 2 may be composed of an all-in-one personal computer including the display unit 205.

The microphone 18 inputs voice such as indication of the user of the PC 2, and outputs the voice to the speaker 8 connected to the PC 1. The speaker 19 outputs voice such as indication of a user of the PC 1 input from the microphone 7 connected to the PC 1. The user of the PC 1 side and the user of the PC 2 side use the microphone 7 and the speaker 8, and the microphone 18 and the speaker 19, respectively, to communicate with each other by voice.

The UI 16 includes a group of buttons such as a pen button, a text button, and an erase button, and icons defined by lines and colors. The images captured by the first camera 5 and the second camera 6 are displayed in the display area 15. In FIG. 1, the image of the table 10 including the object 9 and the storing button 11 (first indication data) that is captured by the first camera 5 is displayed in the display area 15. In addition, the image captured by the second camera 6 is displayed in a display frame 17 of the inside of the display area 15. When a command to use the second camera 6 is input from an operating unit 204 described later, the PC 2 causes the display unit 205 to display the display frame 17 inside the display area 15, and causes the display frame 17 to display the image captured by the second camera 6.

For example, when the pen button of the UI 16 is pressed to draw a figure or the like on the object 9 in the display area 15, the information about the figure is output from the PC 2 to the projector 4 via the PC 1. The projector 4 draws the figure onto the object 9 based on the information about the figure.

The PC 2 outputs control commands to the PC 1 so as to control operations of the projector 4, the first camera 5 and the second camera 6 (such as the capture angles of images captured by the first camera 5, the brightness of images captured by the first camera 5 and the second camera 6, and the brightness of images projected by the projector 4).

In FIG. 1, the number of clients is only one (the PC 2) but the remote indication system may include two or more clients (PCs).

Figure 2:
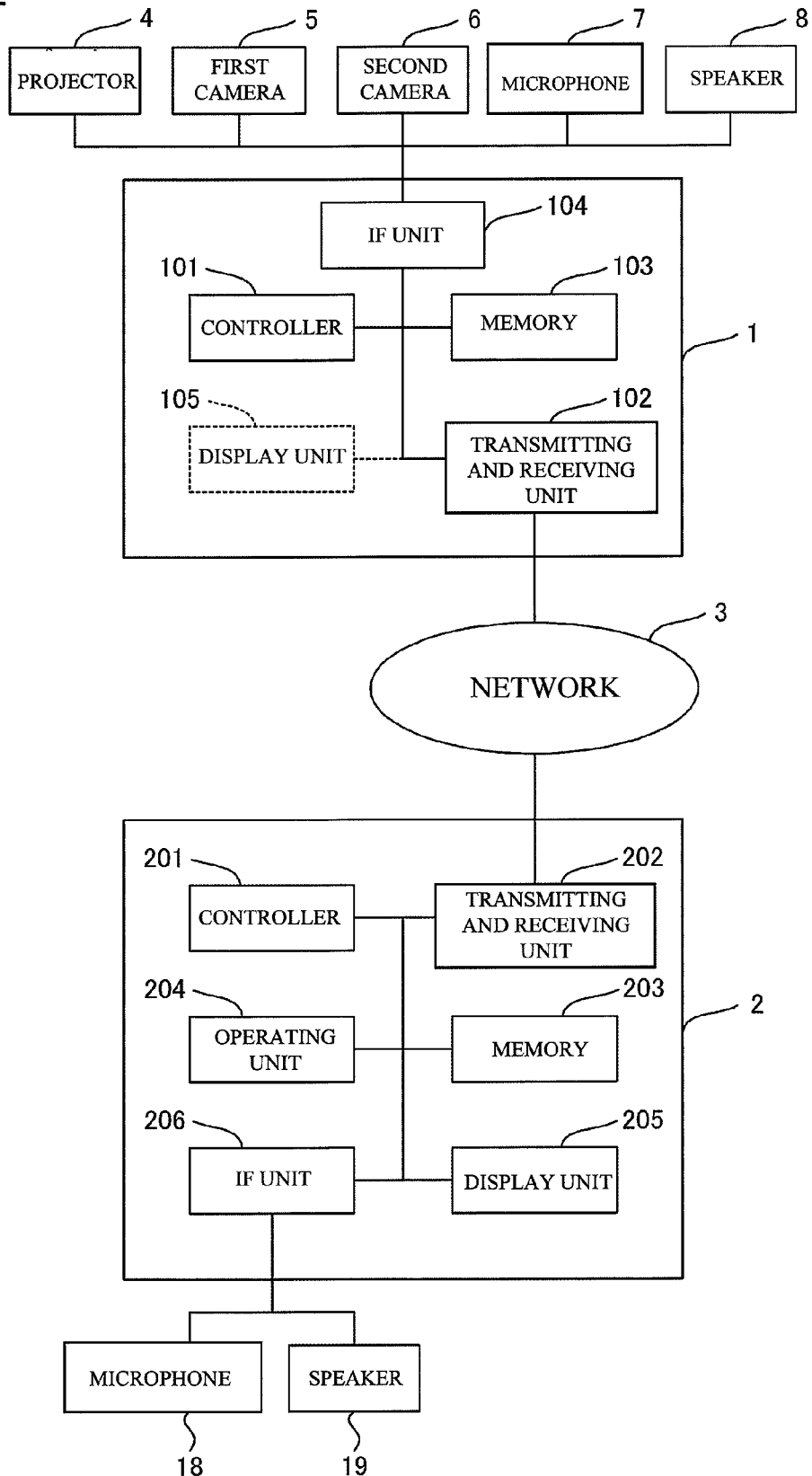
FIG. 2 is a block diagram showing the functional structure of a PC 1 and a PC 2.

FIG. 2 is a block diagram showing the functional structures of the PC 1 and the PC 2.

The PC 1 includes: a controller 101 (an acquiring portion, a detecting portion, and a controller) that controls operations of the projector 4, the first camera 5, the second camera 6, the microphone 7 and the speaker 8, as well as the entire device; a transmitting and receiving unit 102 that transmits and receives information and data to/from the PC 2 via the network 3; a memory 103 that stores control programs, data, information, and the likes; and an interface (IF) unit 104 that connects to the projector 4, the first camera 5, the second camera 6, the microphone 7 and the speaker 8. Further, the PC 1 may include a display unit 105 for displaying the image captured by the second camera 6. The controller 101 is connected to the transmitting and receiving unit 102, the memory 103, the IF unit 104, and the display unit 105. The controller 101 is further connected to the projector 4, the first camera 5, the second camera 6, the microphone 7 and the speaker 8 via the IF unit 104.

The PC 2 includes: a controller 201 that controls the entire device; a transmitting and receiving unit 202 that transmits and receives information and data to/from the PC 1 via the network 3; a memory 203 that stores controls programs, data, information, and the likes; an operating unit 204 that is formed with a mouse, a keyboard, and the likes; a display 205; an interface (IF) unit 206 that connects to the microphone 18 and the speaker 19. The controller 201 is connected to the transmitting and receiving unit 202, the memory 203, the operating unit 204, the display 205, and the IF unit 206.

Figure 3A:
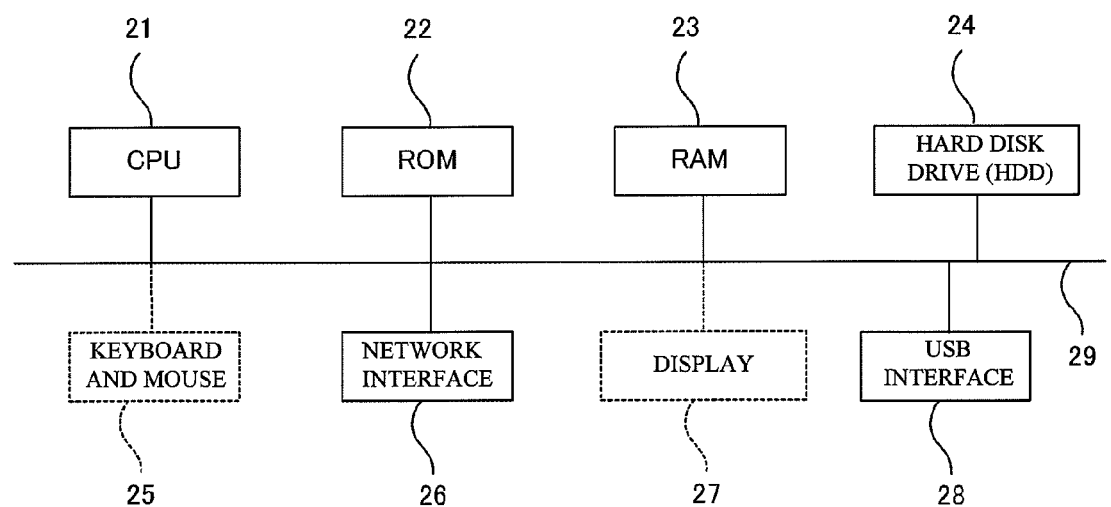
FIG. 3A is a block diagram showing the hardware structure of the PC 1.
Figure 3B:
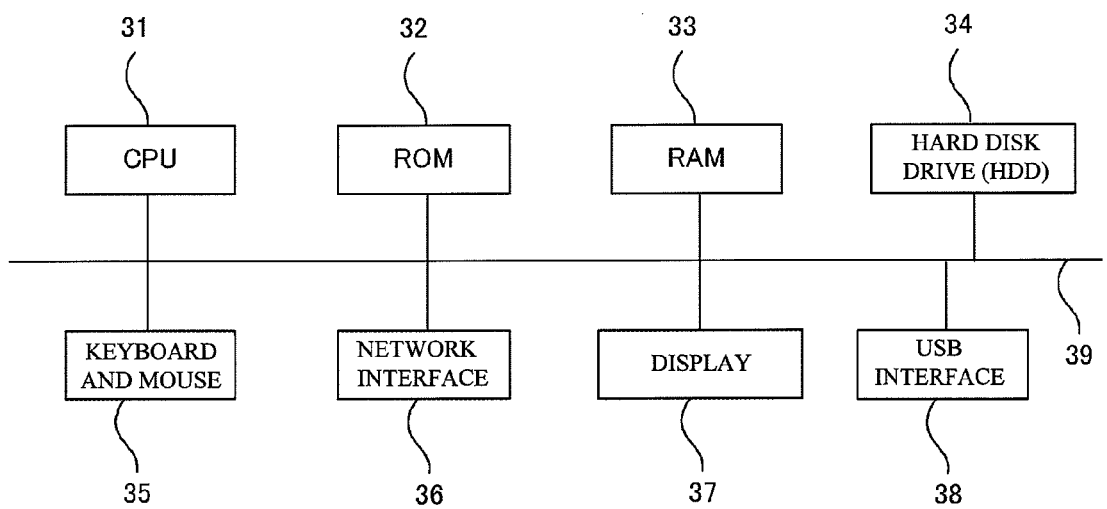
FIG. 3B is a block diagram showing the hardware structure of the PC 2.

FIG. 3A is a block diagram showing the hardware structure of the PC 1, and FIG. 3B is a block diagram showing the hardware structure of the PC 2.

The PC 1 includes: a CPU 21 that controls the entire device; a ROM 22 that stores control programs; a RAM 23 that functions as a working area; a hard disk drive (HDD) 24 that stores various kinds of information and programs; a network interface 26 that connects to another computer; and a USB (universal serial bus) interface 28 that connects to a USB device, not shown. The CPU 21 is connected to the ROM 22, the RAM 23, the hard disk drive (HDD) 24, the network interface 26, and the USB interface 28 via a system bus 29. The PC 1 is connected to the projector 4, the first camera 5, the second camera 6, the microphone 7 and the speaker 8 via the USB interface 28. It should be noted that the PC 1 may include a keyboard and mouse 25, and a display 27.

The controller 101 is equivalent to the CPU 21 that performs various kinds of operations in accordance with the control programs. The transmitting and receiving unit 102 is equivalent to the network interface 26, and the memory 103 is equivalent to the hard disk drive (HDD) 24. The display 105 is equivalent to the display 27.

The PC 2 includes: a CPU 31 that controls the entire device; a ROM 32 that stores control programs; a RAM 33 that functions as a working area; a hard disk drive (HDD) 34 that stores various kinds of information and programs; a keyboard and mouse 35; a network interface 36 that connects to another computer; a display 37 that is formed with a liquid crystal monitor or a CRT; and a USB (universal serial bus) interface 38 that connects to a USB device, not shown. The CPU 31 is connected to the ROM 32, the RAM 33, the hard disk drive (HDD) 34, the keyboard and mouse 35, the network interface 36, the display 37, and the USB interface 38 via a system bus 39. The PC 2 is connected to the microphone 18 and the speaker 19 via the USB interface 38.

The controller 201 is equivalent to the CPU 31 that performs various kinds of operations in accordance with the control programs. The transmitting and receiving unit 202 is equivalent to the network interface 36, and the memory 203 is equivalent to the hard disk drive (HDD) 34. The operating unit 204 is equivalent to the keyboard and mouse 35, and the display 205 is equivalent to the display 37.

Figure 4:
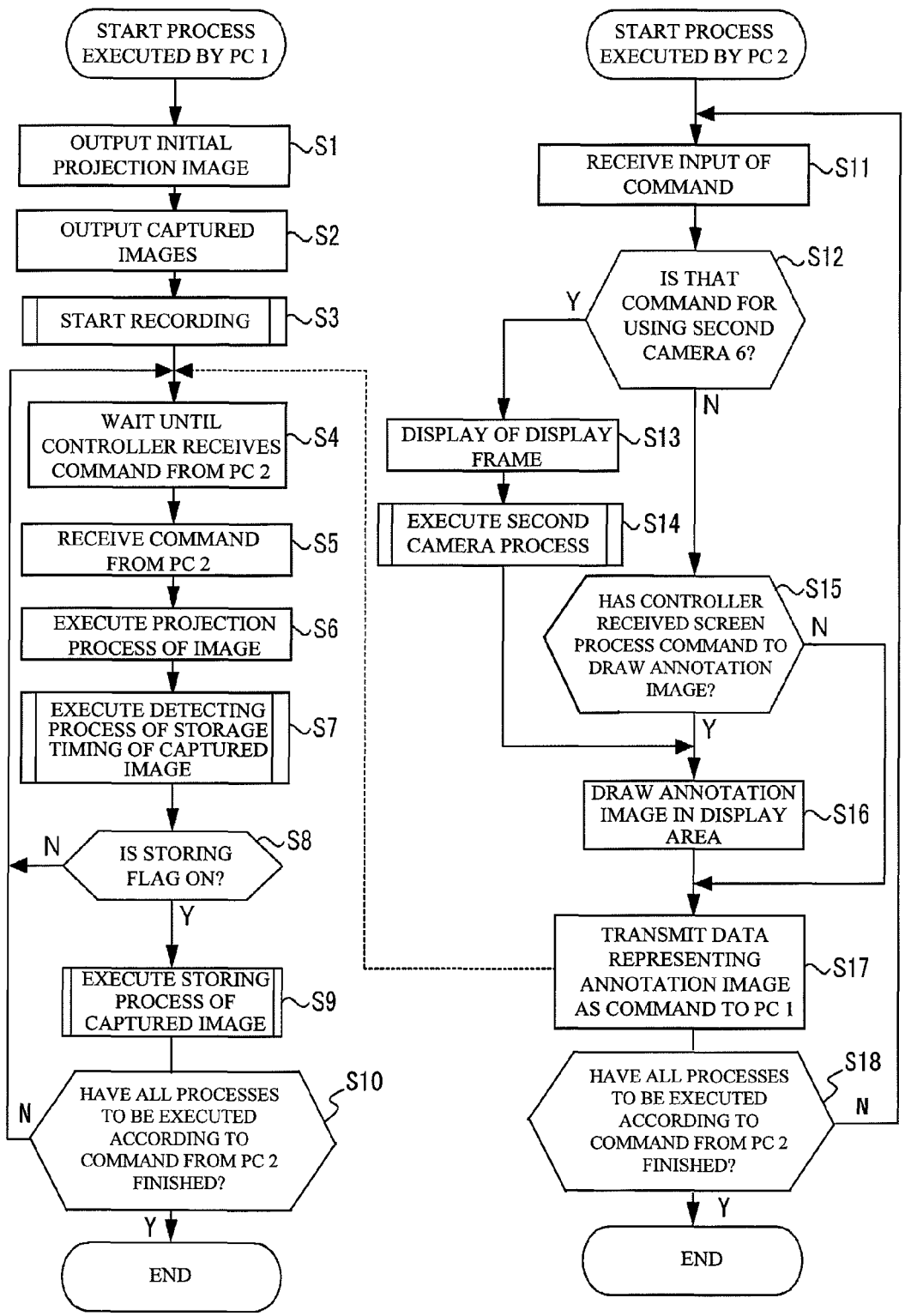
FIG. 4 is a flowchart showing processes executed by the PC 1 and the PC 2.

FIG. 4 is a flowchart showing processes executed by the PC 1 and the PC 2.

First, a description will now be given of a process executed by the PC 1. The controller 101 of the PC 1 outputs an initial projection image to the projector 4 (step S1). The initial projection image is a black image.

Next, the controller 101 outputs the images captured by the first camera 5 and the second camera 6 to the PC 2 via the transmitting and receiving unit 102 and the network 3 (step S2).

The microphone 7 starts recording the indication from the user of the PC 1 and the voice output from the speaker 8 (step S3). Then, the controller 101 waits until the controller 101 receives a command from the PC 2 (step S4). Specifically, the command from the PC 2 is data representing the annotation image. For example, when the annotation image is a circle, the command is information representing a center and a radius of the circle by text data.

Next, when the transmitting and receiving unit 102 receives the command from the PC 2 (step S5), the controller 101 executes a projection process of the image according to the command (step S6). Specifically, when data representing the annotation image is received from the PC 2, the controller 101 outputs the data representing the annotation image to the projector 4. The projector 4 projects the annotation image based on this data.

The controller 101 executes a detecting process of storage timing of the captured image (step S7). In the detecting process of storage timing of the captured image, the controller 101 detects whether the user of the PC 1 has intercepted the projected storing button 11. When the user of the PC 1 has intercepted the projected storing button 11, the captured image is stored in the memory 103. The details of the detecting process of storage timing of the captured image will be described later.

Next, the controller 101 determines whether a storing flag is ON (step S8). The storing flag is stored in the memory 103. The ON/OFF of the storing flag is set by the detecting process of storage timing of the captured image in above-mentioned step S7.

When the answer to the determination of step S8 is NO, the process returns to step S4. On the other hand, when the answer to the determination of step S8 is YES, the controller 101 executes a storing process of the captured image (step S9). In the storing process of the captured image, the controller 101 stores the captured image, attribution information thereof, and recording data in the memory 103. The details of the storing process of the captured image will be described later.

Next, the controller 101 determines whether all the processes to be executed according to a command from the PC 2 have finished (step S10). When the answer to the determination of step S10 is NO, the process returns to step S4. On the other hand, when the answer to the determination of step S10 is YES, the process executed by the PC 1 is terminated.

Next, a description will now be given of a process executed by the PC 2.

When the controller 201 receives input of a command from the operating unit 204 (step S11), the controller 201 determines whether the command is a command for using the second camera 6 (step S12).

When the answer to the determination of step S12 is YES, the display unit 205 displays the display frame 17 inside the display area 15 (step S13). The controller 201 executes a second camera process (step S14). The process then proceeds to step S16.

Here, a description will now be given, with reference to FIG. 5, of the second camera process in step S14.

Figure 5:
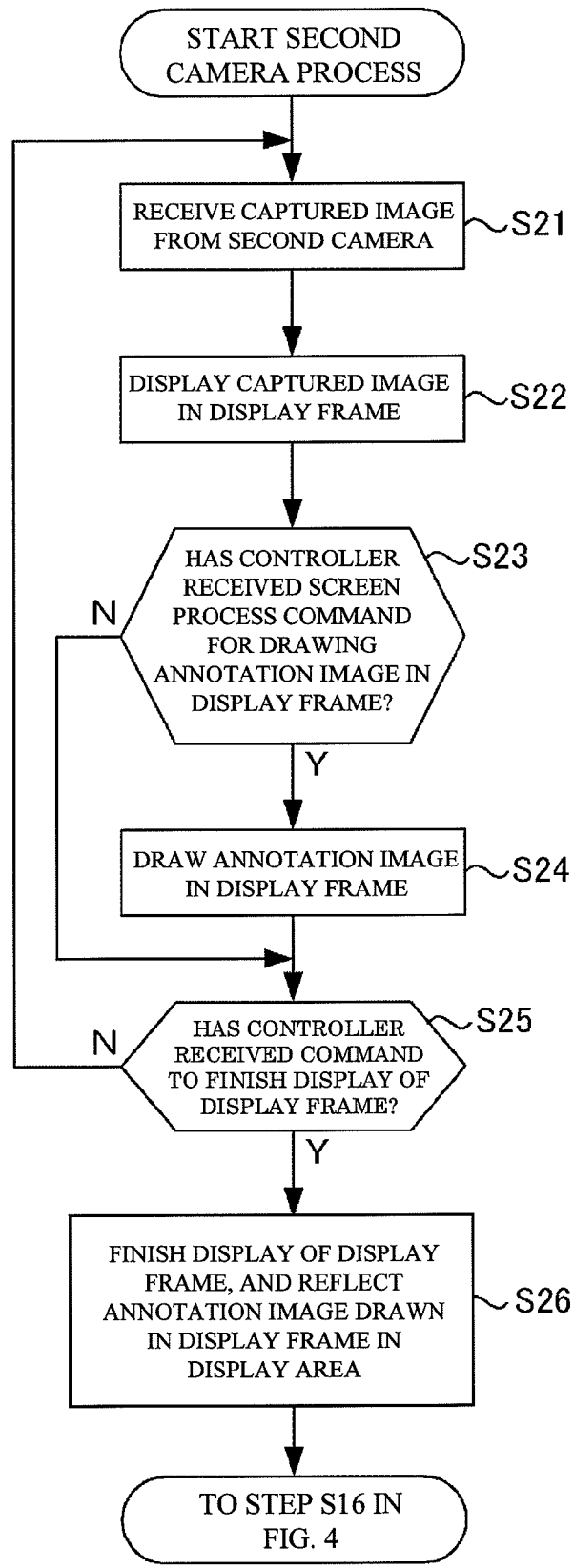
FIG. 5 is a flowchart showing a second camera process of step S14 in FIG. 4.

In the second camera process of FIG. 5, first, the transmitting and receiving unit 202 receives the captured image from the second camera 6 (step S21), the display unit 205 displays the captured image in the display frame 17 of the inside of the display area 15 (step S22).

Next, the controller 201 determines whether the controller 201 has received a screen process command for drawing the annotation image in the display frame 17 from the operating unit 204 (step S23). When the answer to the determination of step S23 is YES, the controller 201 draws the annotation image in the display frame 17 according to the screen process command (step S24). When the answer to the determination of step S23 is NO, the process proceeds to step S25.

Next, the controller 201 determines whether the controller 201 has received a command to finish display of the display frame 17 from the operating unit 204 (step S25). When the answer to the determination of step S25 is NO, the process returns to step S21. On the other hand, when the answer to the determination of step S25 is YES, the display unit 205 finishes display of the display frame 17, and at the same time reflects the annotation image drawn in the display frame 17 in the display area 15 (step S26). The process then proceeds to step S16.

Returning to FIG. 4, when the answer to the determination of step S12 is NO, the controller 201 determines whether the controller 201 has received the screen process command to draw the annotation image from the operating unit 204 (step S15).

When the answer to the determination of step S15 is NO, the process proceeds to step S17. When the answer to the determination of step S15 is YES, the controller 201 draws the annotation image in the display area 15 according to the screen process command (step S16).

Next, the controller 201 transmits data representing the annotation image as a command to the PC 1 via the transmitting and receiving unit 202 (step S17). The command transmitted to the PC 1 is received by the transmitting and receiving unit 102 in a procedure of step S5.

Finally, the controller 201 determines whether all the processes that should be executed by the PC 2 have finished (step S18). When the answer to the determination of step S18 is NO, the process returns to step S11. On the other hand, when the answer to the determination of step S18 is YES, the process executed by the PC 2 is terminated.

Figure 6:
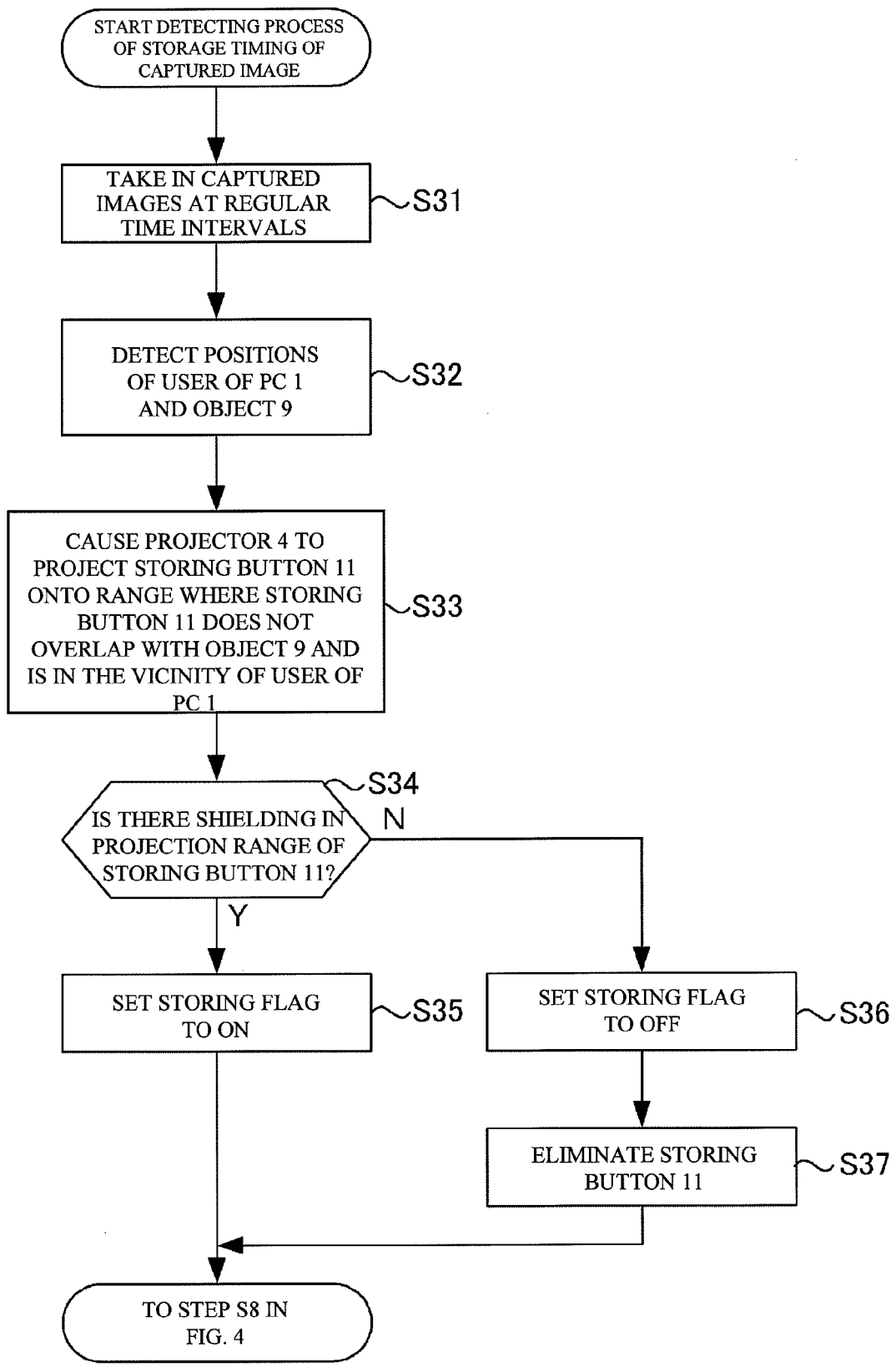
FIG. 6 is a flowchart showing a detecting process of storage timing of a captured image of step S7 in FIG. 4.

FIG. 6 is a flowchart showing a detecting process of storage timing of the captured image of step S7 in FIG. 4.

The controller 101 takes in images captured by the first camera 5 at regular time intervals (e.g. 0.1 seconds), i.e., captures the images as still images (step S31). Then, the controller 101 sequentially compares an image in which the user of the PC 1 does not appear with the continuously-captured images to detect a position of the user of the PC 1, and sequentially compares an image in which the object 9 does not appear with the continuously-captured images to detect a position of the object 9 (step S32). Specifically, the controller 101 abstracts difference (especially, edges of difference) between the image in which the user of the PC 1 does not appear and the continuously-captured images. When a human characteristic (e.g. substantially circle-shaped head, a hand, or the like) is included in the difference, the controller 101 detects a position of the difference in the continuously-captured images as the position of the user of the PC 1. Similarly, the controller 101 abstracts difference (especially, edges of difference) between the image in which the object 9 does not appear and the continuously-captured images. When a characteristic of the object 9 (e.g. a shape of the object 9) is included in the difference, the controller 101 detects a position of the difference in the continuously-captured images as the position of the object 9.

As a method to detect the position of the user of the PC 1, the user of the PC 1 prepares a camera photographing wide space including the projector 4, the first camera 5, the second camera 6, and the object 9, and the position of the user of the PC 1 may be detected from an image captured by the prepared camera. Further, the position of the user of the PC 1 may be detected with a transmitter or an RFID tag carried with the user of the PC 1.

Figure 7:
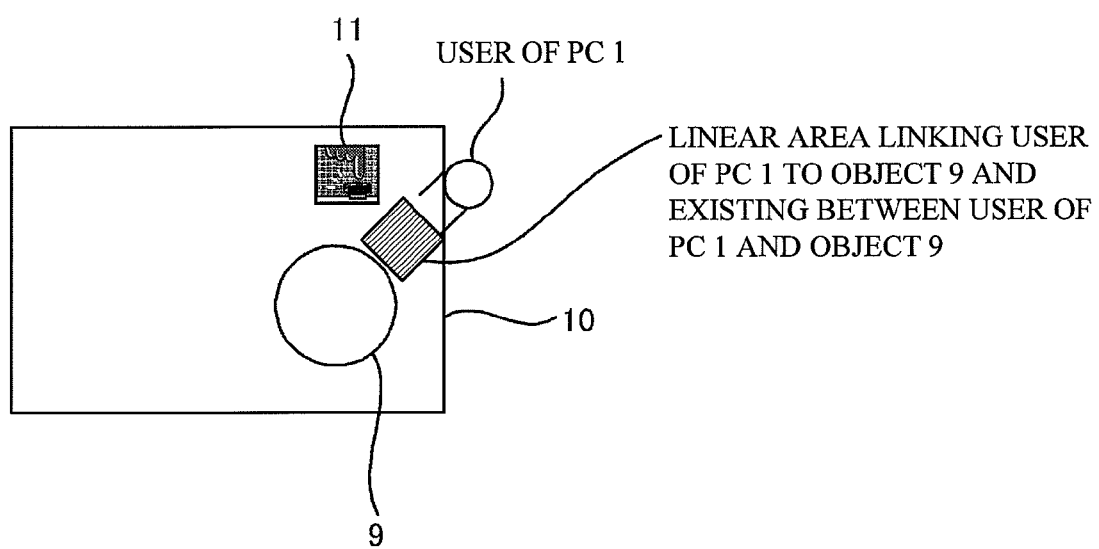
FIG. 7 is a diagram showing an example of a linear area which links a user of the PC 1 and an object 9 together and is arranged between the user of the PC 1 and the object 9.

The controller 101 causes the projector 4 to project the storing button 11 onto a range where the storing button 11 does not overlap with the object 9 and is in the vicinity of the user of the PC 1, based on the detected position of the user of the PC 1 and the detected position of the object 9 (step S33). Specifically, the controller 101 causes the projector 4 to project the storing button 11 onto an area except for a linear area linking the user of the PC 1 to the object 9 and existing between the user of the PC 1 and the object 9, based on the detected position of the user of the PC 1 and the detected position of the object 9. More preferably, the controller 101 causes the projector 4 to project the storing button 11 onto a predetermined range where the hand of the user of the PC 1 reaches, e.g. the predetermined range that is around 30-50 centimeters away from the user of the PC 1. The predetermined range is in the area except for the linear area linking the user of the PC 1 to the object 9 and existing between the user of the PC 1 and the object 9. FIG. 7 shows an example of the linear area linking the user of the PC 1 to the object 9 and existing between the user of the PC 1 and the object 9.

The linear area linking the user of the PC 1 to the object 9 and existing between the user of the PC 1 and the object 9 is excepted from a projection position of the storing button 11. This prevents the storing process in which the user of the PC 1 does not intend from being executed when the projected storing button 11 is interrupted by operation other than storing the captured image.

Next, the controller 101 compares the taken-in image with the previous taken-in image, i.e., compares the captured still image with the previous captured still image, and determines whether there is a shielding in a projection range of the storing button 11 (step S34).

When the answer to the determination of step S34 is YES, the controller 101 sets the storing flag to ON (step S35), and the process proceeds to step S8 in FIG. 4. When the answer to the determination of step S34 is NO, the controller 101 sets the storing flag to OFF (step S36) and eliminates the storing button 11 (step S37), and the process proceeds to step S8 in FIG. 4.

Figure 8:
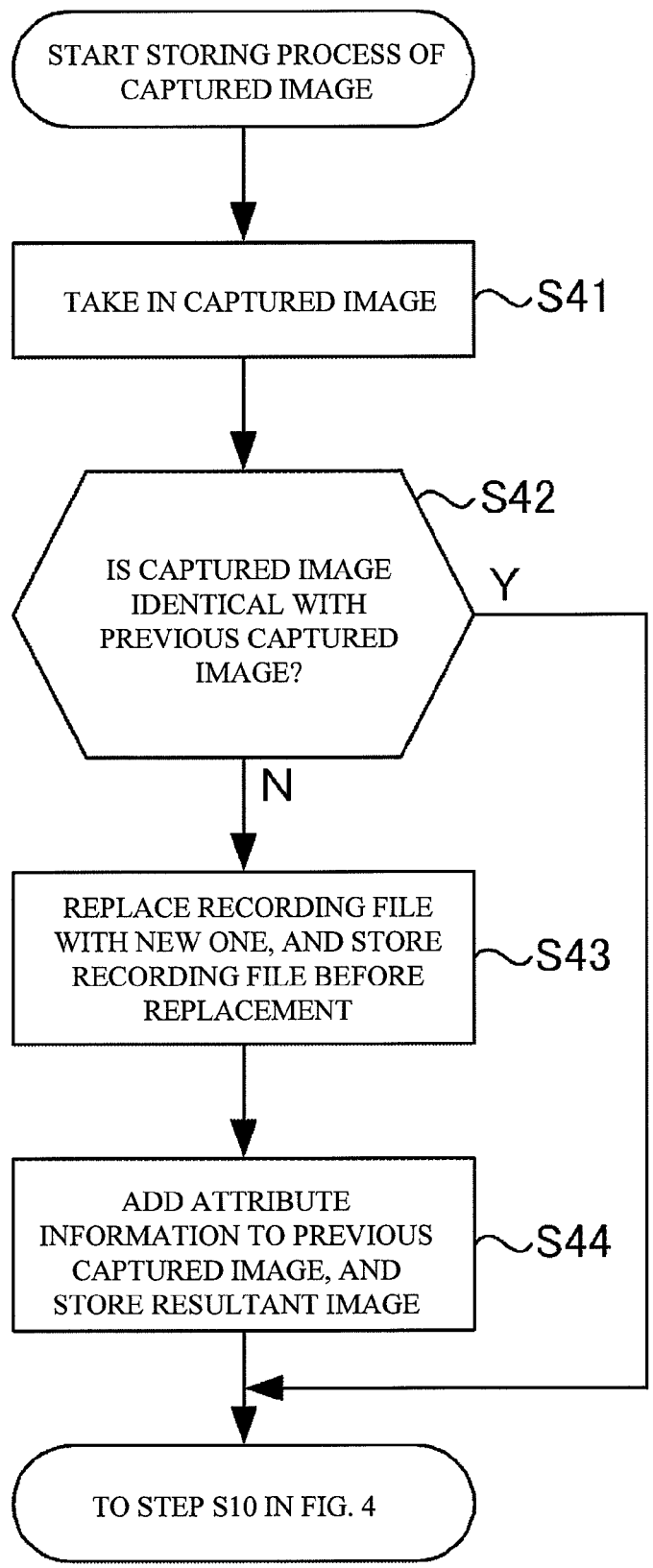
FIG. 8 is a flowchart showing a storing process of the captured image of step S9 in FIG. 4.

FIG. 8 is a flowchart showing the storing process of the captured image of step S9 in FIG. 4.

The controller 101 takes in the image captured by first camera 5 (step S41), and determines whether the captured image is identical with the previous captured image (step S42).

Figure 9A:
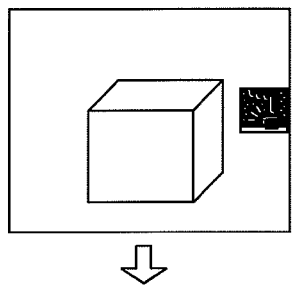
FIGS. 9A to 9C are diagrams showing examples of captured images stored in a memory 103 and attribute information thereof.
Figure 9B:
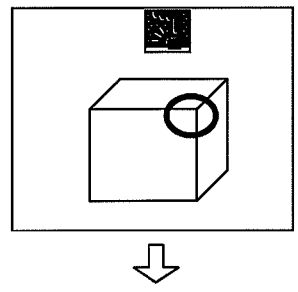
Figure 9C:
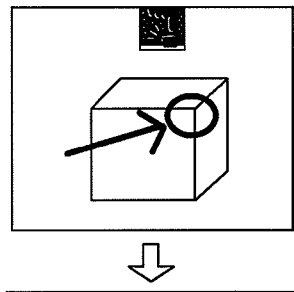

When the answer to the determination of step S42 is YES, the process proceeds to step S10 in FIG. 4. When the answer to the determination of step S34 is NO, the controller 101 replaces a recording file with a new one, and stores the recording file before replacement in the memory 103 (step S43). Then, the controller 101 adds the attribute information to the previous captured image, and stores the resultant image in the memory 103 (step S44). The process then proceeds to step S10 in FIG. 4. The attribute information of the captured image relates the captured image to the recording file. FIGS. 9A to 9C shows examples of the captured images stored in the memory 103 and attribute information thereof. In step S44, the controller 101 may eliminate an image of the storing button 11 from the previous captured image, and stores resultant image in the memory 103.

As described in detail above, according to the first exemplary embodiment, the controller 101 acquires plural images captured by the first camera 5, detects the positions of the object 9 and the user of the PC 1 from the plural captured images, causes the projector 4 to project the storing button 11 onto the area except for the linear area linking the user of the PC 1 to the object 9 and existing between the user of the PC 1 and the object 9, based on the detected position of the user of the PC 1 and the detected position of the object 9. When the storing button 11 projected by the projector 4 has been interrupted, the controller 101 stores the image captured by the first camera 5 in the memory 103. It is therefore possible to store the captured image in timing desired by the user of the PC 1.

When the storing button 11 projected by the projector 4 has been interrupted, the controller 101 relates voice data input by the microphone 7 during a time period from projection of the captured image by the projector 4 to interrupt of the storing button 11, i.e., the recording file to the captured image which should be stored in the memory 103, and stores the recording file and the captured image in the memory 103. It is therefore possible to relate voice data input from the PC 2 and voice data generated by the user of the PC 1 to the captured image in timing desired by the user of the PC 1, and store the voice data and the captured image. Further, it is possible to reproduce a state when the captured image is stored in the memory 103 by voice.

Second Exemplary Embodiment

In the first exemplary embodiment, every time the storing button 11 is interrupted with the hand of the user of the PC 1, the captured image and the recoding file are stored. On the other hand, in the second exemplary embodiment, when a sequence capture button 11a (second indication data) is interrupted with the hand of the user of the PC 1, a sequence of the captured images and a recording file corresponding to this are stored. It should be noted that a projection position of the sequence capture button 11a is decided in the same manner as the projection position of the storing button 11.

Figure 10:
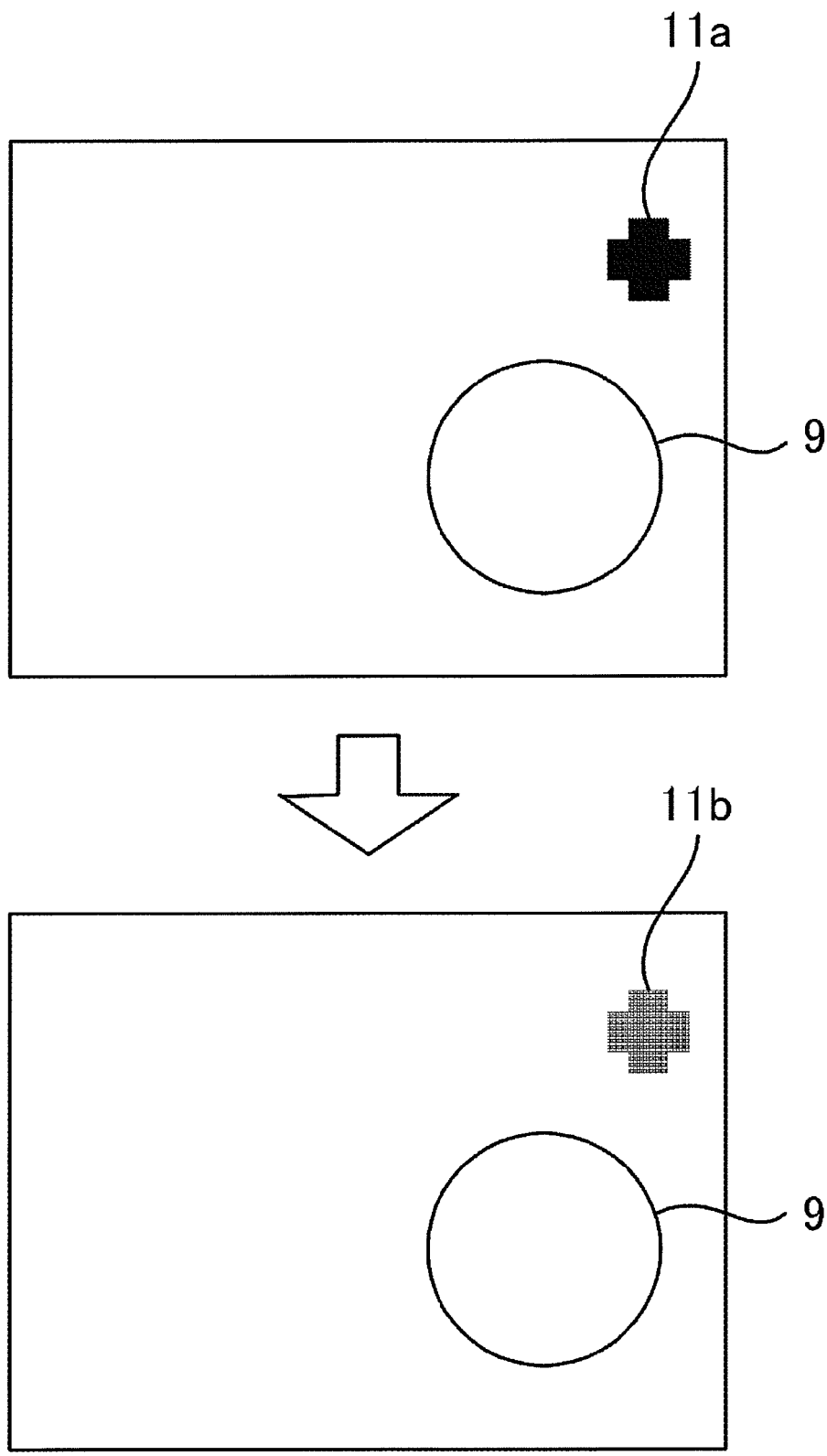
FIG. 10 is a diagram showing a state where a sequence capture button 11a is interrupted with a hand of the user of the PC 1, so that a sequence capture completion button 11b is projected in a second exemplary embodiment of the present invention.

In the second exemplary embodiment, when the sequence capture button 11a projected onto the table 10 is interrupted, a current mode shifts to a sequence capture mode storing the captured image and the recoding file at regular time intervals (e.g. 0.5 seconds), and a sequence capture completion button 11b (third indication data) is projected. When the sequence capture completion button 11b is interrupted, the sequence capture mode is completed. The sequence capture completion button 11b is only different in color from the sequence capture button 11a, and is the same as the sequence capture button 11a in a projection size and a projection position. For example, the sequence capture completion button 11b is red, and the sequence capture button 11a is blue. FIG. 10 shows a state where a sequence capture button 11a is interrupted with the hand of the user of the PC 1, so that the sequence capture completion button 11b is projected.

Figure 11:
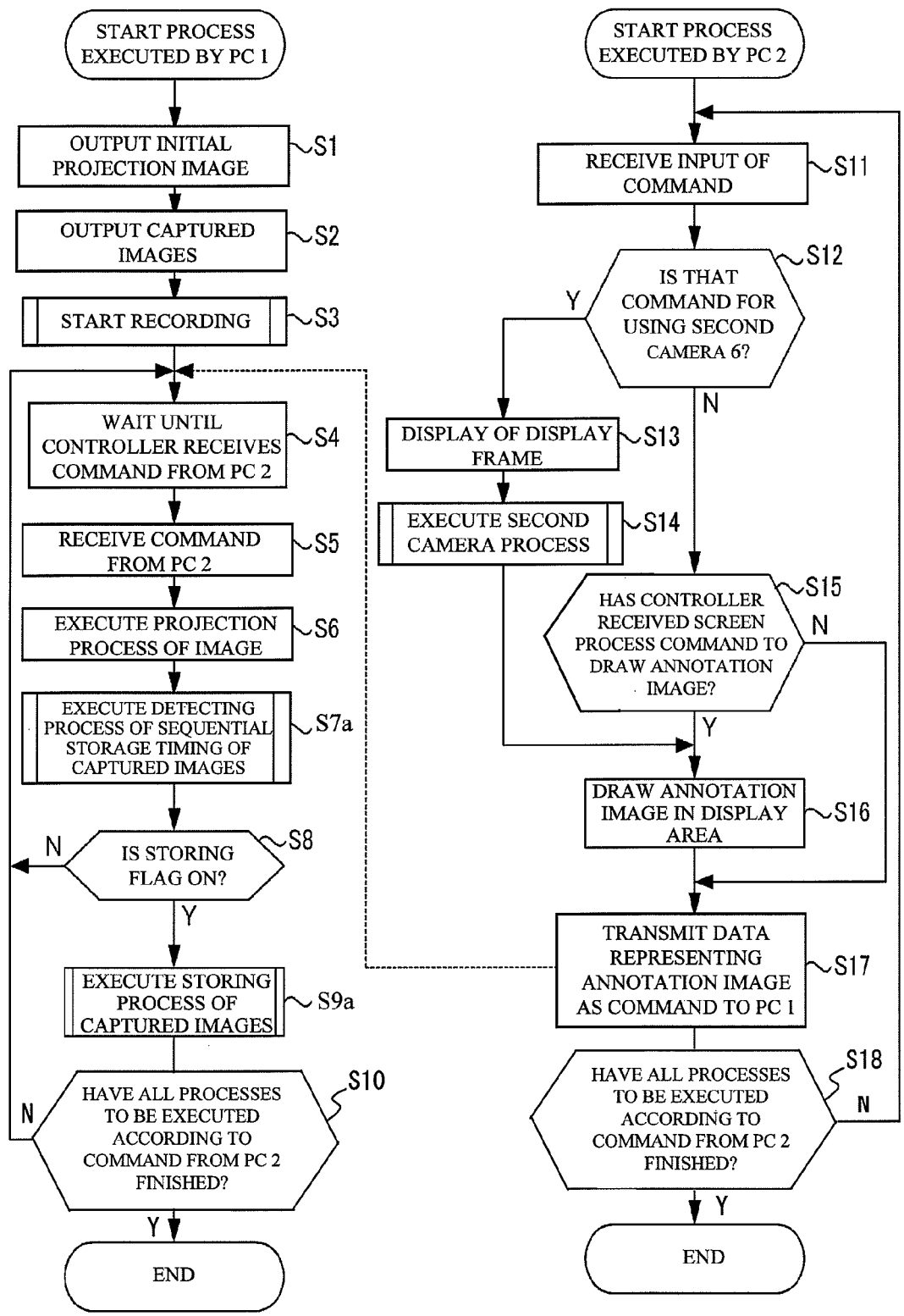
FIG. 11 is a flowchart showing processes executed by the PC 1 and the PC 2.

In the second exemplary embodiment, FIG. 11 shows processes executed by the PC 1 and the PC 2. In the processes executed by the PC 1 and the PC 2 in FIG. 11, a detecting process of sequential storage timing of captured images of step S7a is executed on behalf of the detecting process of storage timing of the captured image of step S7 in FIG. 4, and a storing process of the captured images of step S9a is executed on behalf of the storing process of the captured image of step S9 in FIG. 4. The processes executed by the PC 1 and the PC 2 in FIG. 11 is the same as those in FIG. 4 except for the procedures of steps S7a and S9a, and a description therefore will be given of the only different procedures.

Figure 12:
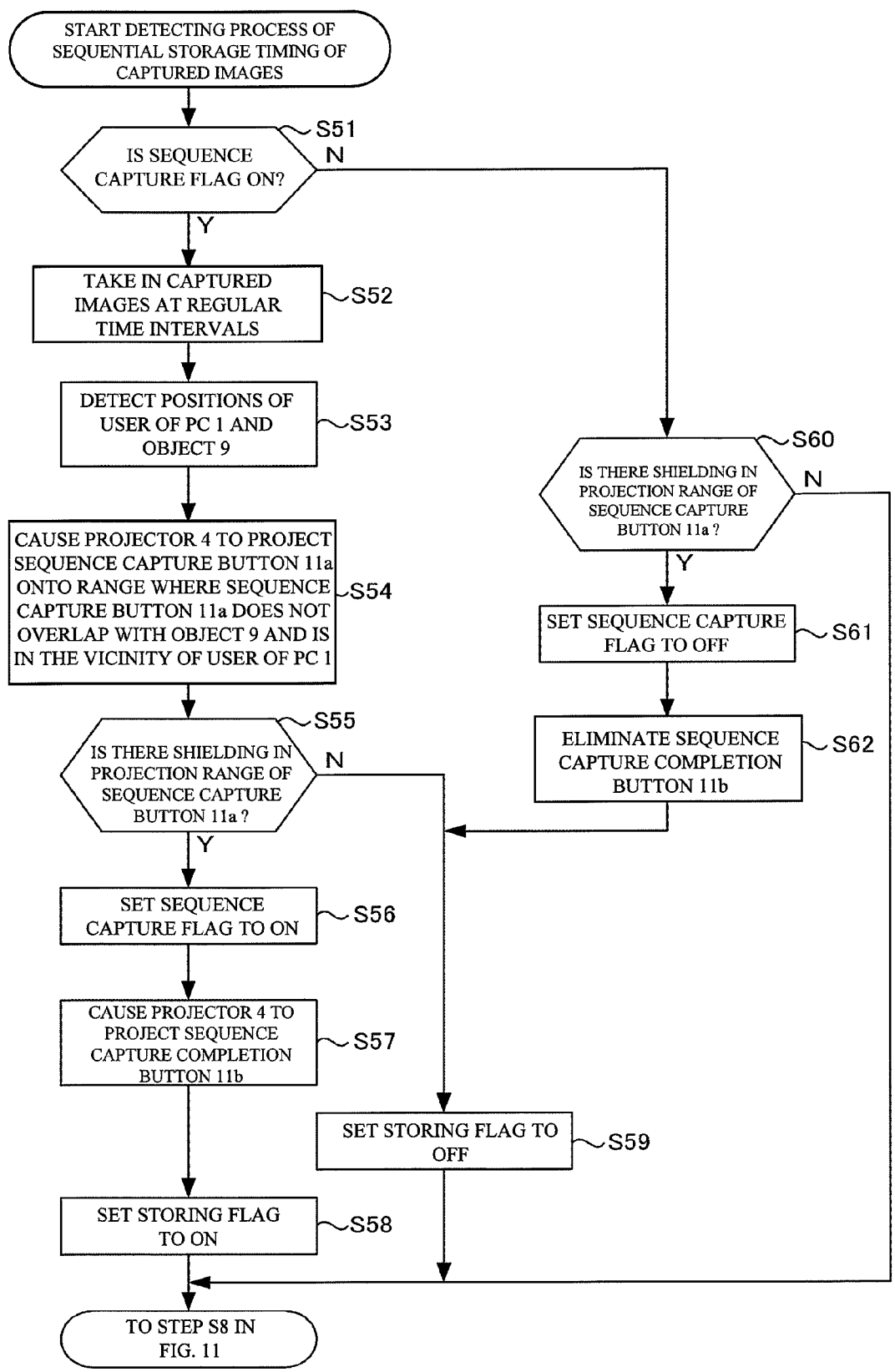
FIG. 12 is a flowchart showing a detecting process of sequential storage timing of captured images of step S7a in FIG. 11.

FIG. 12 is a flowchart showing the detecting process of sequential storage timing of captured images of step S7a in FIG. 11.

The controller 101 determines whether a sequence capture flag is ON (step S51). The sequence capture flag is stored in the memory 103, and an initial state of the sequence capture flag is OFF.

When the answer to the determination of step S51 is YES, the controller 101 takes in images captured by the first camera 5 at regular time intervals (e.g. 0.1 seconds), i.e., captures the images as still images (step S52). Then, the controller 101 sequentially compares an image in which the user of the PC 1 does not appear with the continuously-captured images to detect a position of the user of the PC 1, and sequentially compares an image in which the object 9 does not appear with the continuously-captured images to detect a position of the object 9 (step S53). Specifically, the controller 101 abstracts difference (especially, edges of difference) between the image in which the user of the PC 1 does not appear and the continuously-captured images. When a human characteristic (e.g. substantially circle-shaped head, a hand, or the like) is included in the difference, the controller 101 detects a position of the difference in the continuously-captured images as the position of the user of the PC 1. Similarly, the controller 101 abstracts difference (especially, edges of difference) between the image in which the object 9 does not appear and the continuously-captured images. When a characteristic of the object 9 (e.g. a shape of the object 9) is included in the difference, the controller 101 detects a position of the difference in the continuously-captured images as the position of the object 9.

As a method to detect the position of the user of the PC 1, the user of the PC 1 prepares a camera photographing wide space including the projector 4, the first camera 5, the second camera 6, and the object 9, and the position of the user of the PC 1 may be detected from an image captured by the prepared camera. Further, the position of the user of the PC 1 may be detected with a transmitter or an RFID tag carried with the user of the PC 1.

The controller 101 causes the projector 4 to project the sequence capture button 11a onto a range where the sequence capture button 11a does not overlap with the object 9 and is in the vicinity of the user of the PC 1, based on the detected position of the user of the PC 1 and the detected position of the object 9 (step S54). Specifically, the controller 101 causes the projector 4 to project the sequence capture button 11a onto an area except for a linear area linking the user of the PC 1 to the object 9 and existing between the user of the PC 1 and the object 9, based on the detected position of the user of the PC 1 and the detected position of the object 9. More preferably, the controller 101 causes the projector 4 to project the sequence capture button 11a onto a predetermined range where the hand of the user of the PC 1 reaches, e.g. the predetermined range that is around 30-50 centimeters away from the user of the PC 1. The predetermined range is in the area except for the linear area linking the user of the PC 1 to the object 9 and existing between the user of the PC 1 and the object 9.

The linear area linking the user of the PC 1 to the object 9 and existing between the user of the PC 1 and the object 9 is excepted from a projection position of the sequence capture button 11a. This prevents the storing process in which the user of the PC 1 does not intend from being executed when the sequence capture button 11a is interrupted by operation other than storing the captured image.

Next, the controller 101 compares the taken-in image with the previous taken-in image, i.e., compares the captured still image with the previous captured still image, and determines whether there is a shielding in a projection range of the sequence capture button 11a (step S55).

When the answer to the determination of step S55 is YES, the controller 101 sets the sequence capture flag to ON (step S56), and causes the projector 4 to project the sequence capture completion button 11b at the same position as the sequence capture button 11a (step S57). Then, the controller 101 sets the storing flag to ON (step S58), and the process proceeds to step S8 in FIG. 11.

When the answer to the determination of step S55 is NO, the controller 101 sets the storing flag to OFF (step S59), and the process proceeds to step S8 in FIG. 11.

When the answer to the determination of step S51 is NO, the controller 101 compares the taken-in image with the previous taken-in image, i.e., compares the captured still image with the previous captured still image, and determines whether there is a shielding in a projection range of the sequence capture button 11a (step S60).

When the answer to the determination of step S60 is NO, the process proceeds to step S8 in FIG. 11. On the other hand, when the answer to the determination of step S60 is YES, the controller 101 sets the sequence capture flag to OFF (step S61) and eliminates the sequence capture completion button 11b (step S62), and the process proceeds to step S8 in FIG. 11.

Figure 13:
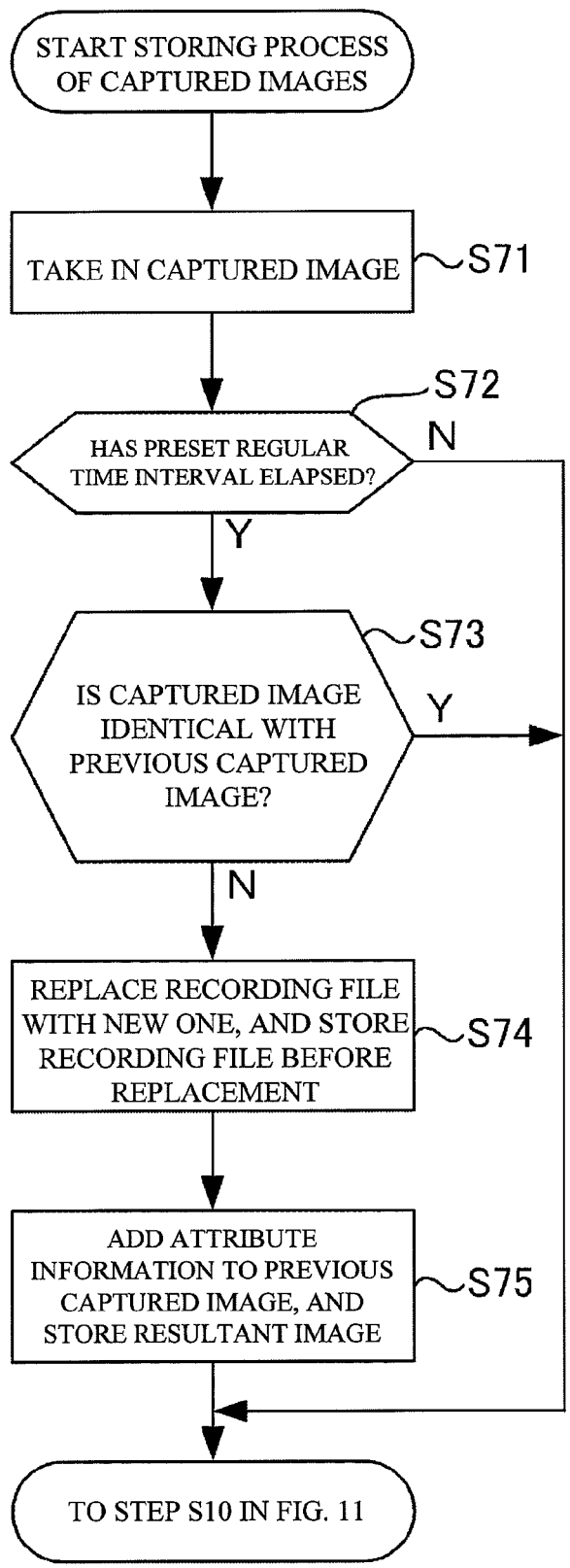
FIG. 13 is a flowchart showing a storing process of the captured images of step S9a in FIG. 11.

FIG. 13 is a flowchart showing the storing process of the captured images of step S9a in FIG. 11.

The controller 101 takes in the image captured by first camera 5 (step S71), and determines whether a preset regular time interval (e.g. 0.1 seconds) has elapsed (step S72). The controller 101 sets a time interval for capturing the image as the still image via the keyboard and mouse 25 of the PC 1 or the keyboard and mouse 35 of the PC 2.

When the answer to the determination of step S72 is NO, the process proceeds to step S10 in FIG. 11. On the other hand, when the answer to the determination of step S72 is YES, the controller 101 determines whether the captured image is identical with the previous captured image (step S73).

When the answer to the determination of step S73 is YES, the process proceeds to step S10 in FIG. 11. When the answer to the determination of step S73 is NO, the controller 101 replaces a recording file with a new one, and stores the recording file before replacement in the memory 103 (step S74). Then, the controller 101 adds the attribute information to the previous captured image, and stores the resultant image in the memory 103 (step S75). The process then proceeds to step S10 in FIG. 11. The attribute information of the captured image relates the captured image to the recording file.

As described in detail above, according to the second exemplary embodiment, the controller 101 causes the projector 4 to project the sequence capture button 11a, which is an indication storing plural images sequentially captured at regular time intervals, onto the area except for the linear area linking the user of the PC 1 to the object 9 and existing between the user of the PC 1 and the object 9, based on the detected position of the user of the PC 1 and the detected position of the object 9. When the sequence capture button 11a projected by the projector 4 has been interrupted, the controller 101 stores the plural images sequentially captured at regular time intervals by the first camera 5 in the memory 103. It is therefore possible to store the plural images sequentially captured at regular time intervals in timing desired by the user of the PC 1.

Further, when the sequence capture button 11a projected by the projector 4 has been interrupted, the controller 101 causes the projector 4 to project the sequence capture completion button 11b, which is an indication to complete storing plural captured images, at the same position as the sequence capture button 11a on behalf of the sequence capture button 11a. When the sequence capture completion button 11b projected by the projector 4 has been interrupted, the controller 101 completes storing plural captured images in the memory 103. It is therefore possible to complete storing plural images sequentially captured at regular time intervals.

Third Exemplary Embodiment

In the first exemplary embodiment, every time the storing button 11 is interrupted with the hand of the user of the PC 1, the captured image and the recoding file are stored. On the other hand, in the third exemplary embodiment, a self-timer mode is prepared. When a storing button with a timer 11c (fourth indication data) is interrupted with the hand of the user of the PC 1, the countdown of the timer is started, and the captured image and the recording file when time designated with the timer has elapsed are stored.

Figure 14A:
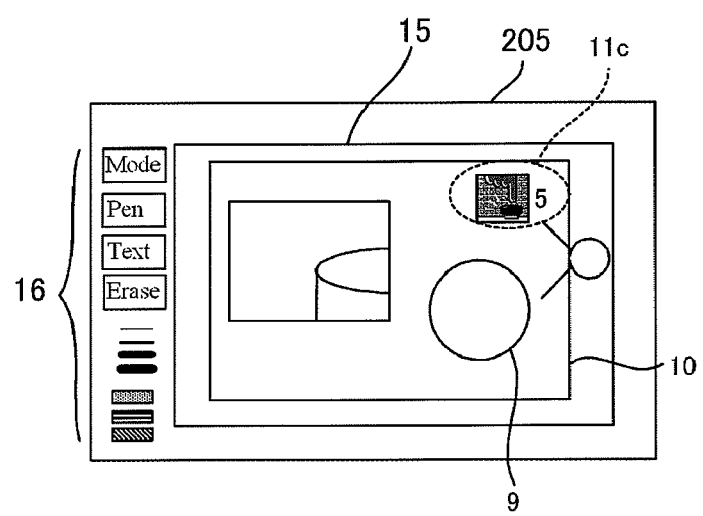
FIG. 14A is a diagram showing a state where a storage button with a timer 11c is pasted in a display area 15.
Figure 14B:
FIG. 14B is a diagram schematically showing a state of countdown of the timer.

Projection of the storing button with the timer 11c onto the table 10 is executed by the user of the PC 2. Specifically, the user of the PC 2 presses down a mode button on a user interface, not shown, displayed in the display unit 205 shown in FIG. 14A, selects the storing button with the timer 11c, and pastes the storing button with the timer 11c on a suitable position of the display area 15. Beside the storing button with the timer 11c, time set via the operating unit 204 is displayed. When the storing button with the timer 11c is interrupted with the hand of the user of the PC 1, the countdown of the timer is started as shown in FIG. 14B.

When the user of the PC 2 selects the storing button with the timer 11c, and pastes the storing button with the timer 11c on a suitable position of the display area 15, the storing button with the timer 11c is projected onto the table 10 as the annotation image. Therefore, the user of the PC 1 sees the storing button with the timer 11c on the table 10, to thereby know the self-timer mode and remaining time of the countdown. The user of the PC 2 sees the storing button with the timer 11c in the display area 15, to thereby know the self-timer mode and remaining time of the countdown. It should be noted that the remaining time of the countdown may be output by voice via the speakers 8 and 19.

Figure 15:
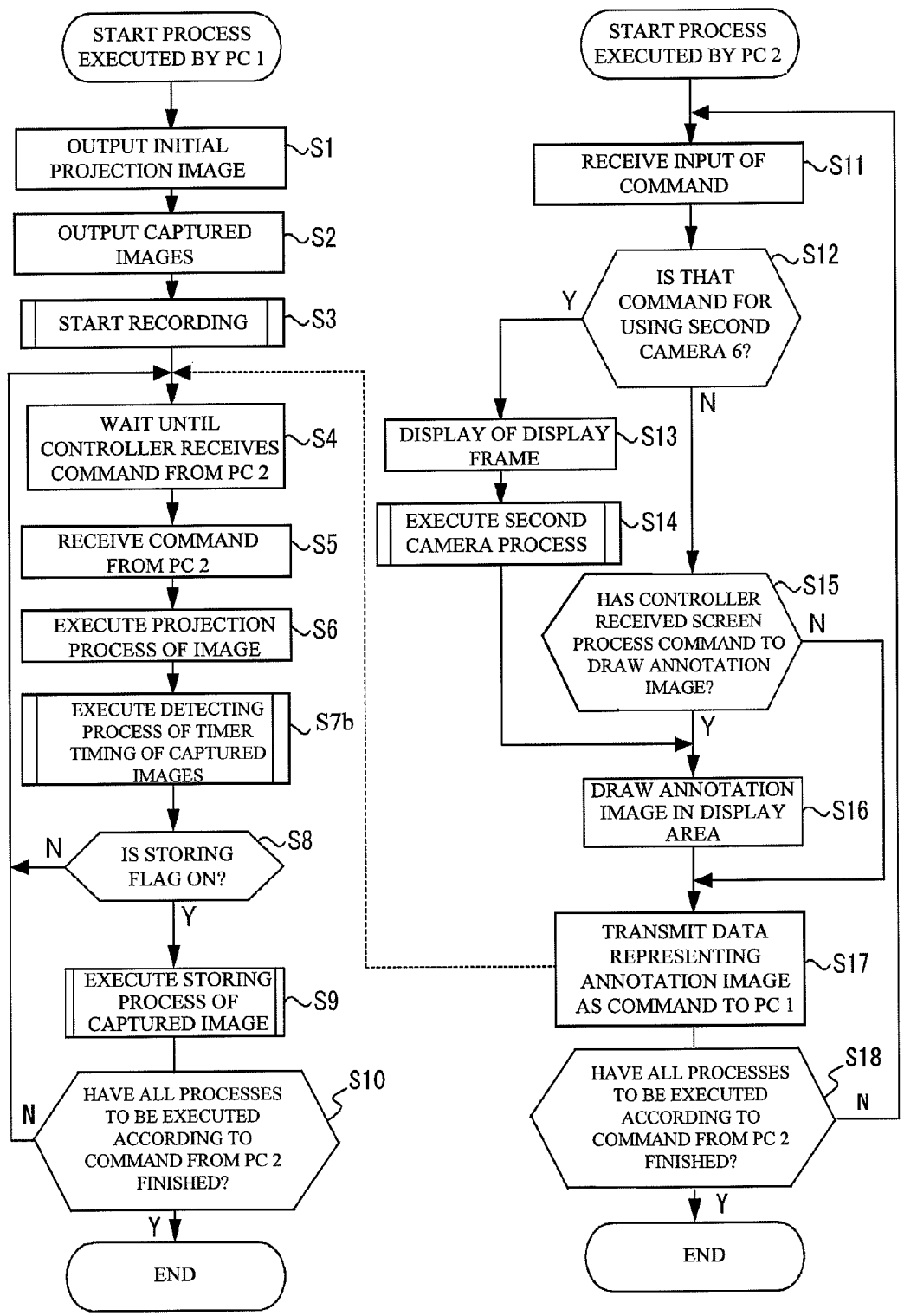
FIG. 15 is a flowchart showing processes executed by the PC 1 and the PC 2 in accordance with a third exemplary embodiment of the present invention.

In the third exemplary embodiment, FIG. 15 shows processes executed by the PC 1 and the PC 2. In the processes executed by the PC 1 and the PC 2 in FIG. 15, a detecting process of timer timing of captured images of step S7b is executed on behalf of the detecting process of storage timing of the captured image of step S7 in FIG. 4. The processes executed by the PC 1 and the PC 2 in FIG. 15 is the same as those in FIG. 4 except for the procedure of step S7b, and a description therefore will be given of the only different procedure.

Figure 16:
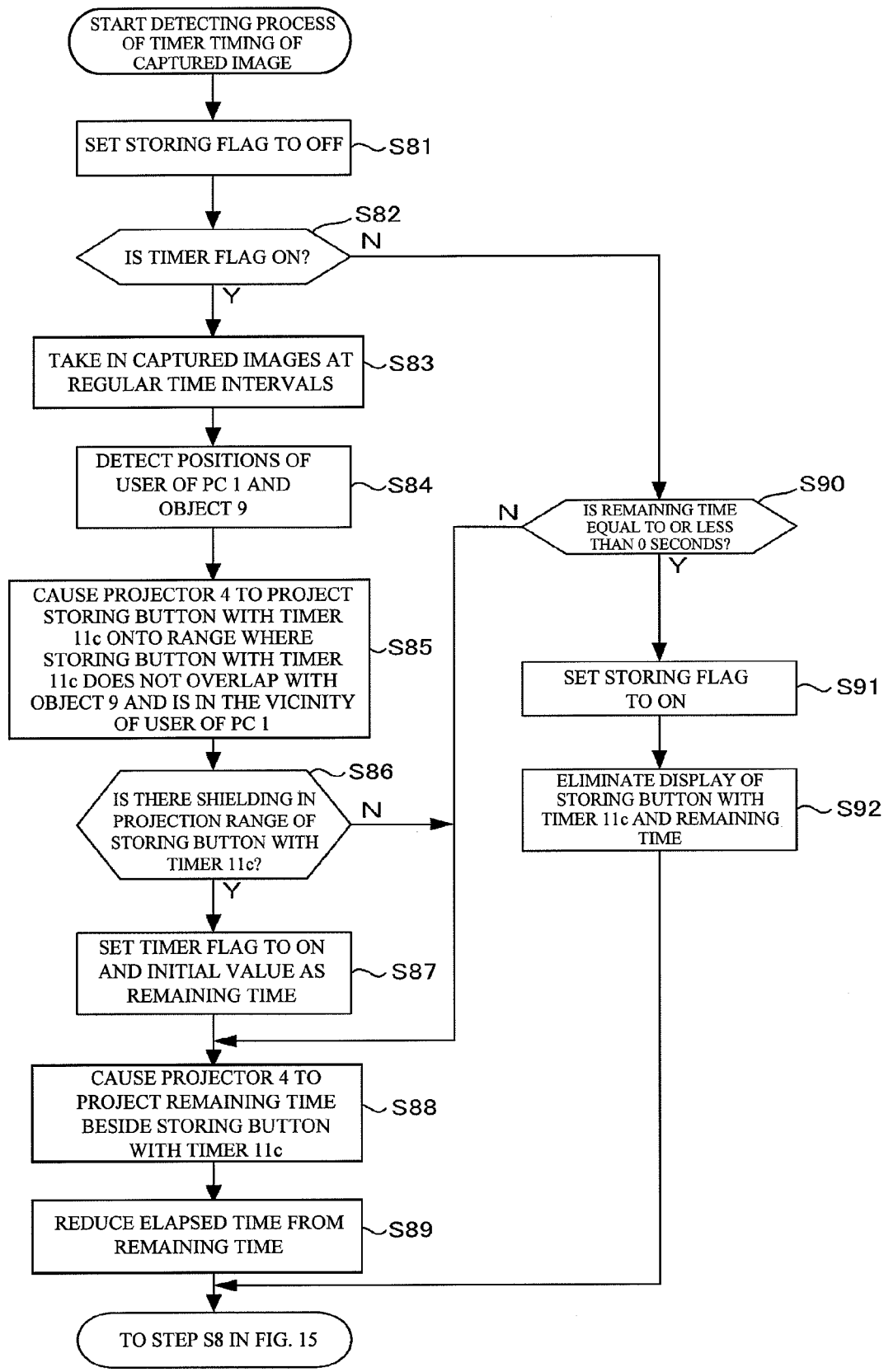
FIG. 16 is a flowchart showing a detecting process of timer timing of a captured image of step S7b in FIG. 15.

FIG. 16 is a flowchart showing the detecting process of timer timing of the captured image of step S7b in FIG. 15.

The controller 101 sets the storing flag to OFF (step S81). Then, the controller 101 determines whether a timer flag is ON (step S82). The timer flag is stored in the memory 103, and an initial state of the timer flag is OFF.

When the answer to the determination of step S82 is YES, the controller 101 takes in images captured by the first camera 5 at regular time intervals (e.g. 0.1 seconds), i.e., captures the images as still images (step S83). Then, the controller 101 sequentially compares an image in which the user of the PC 1 does not appear with the continuously-captured images to detect a position of the user of the PC 1, and sequentially compares an image in which the object 9 does not appear and the continuously-captured images to detect a position of the object 9 (step S84). Specifically, the controller 101 abstracts difference (especially, edges of difference) between the image in which the user of the PC 1 does not appear and the continuously-captured images. When a human characteristic (e.g. substantially circle-shaped head, a hand, or the like) is included in the difference, the controller 101 detects a position of the difference in the continuously-captured images as the position of the user of the PC 1. Similarly, the controller 101 abstracts difference (especially, edges of difference) between the image in which the object 9 does not appear and the continuously-captured images. When a characteristic of the object 9 (e.g. a shape of the object 9) is included in the difference, the controller 101 detects a position of the difference in the continuously-captured images as the position of the object 9.

As a method to detect the position of the user of the PC 1, the user of the PC 1 prepares a camera photographing wide space including the projector 4, the first camera 5, the second camera 6, and the object 9, and the position of the user of the PC 1 may be detected from an image captured by the prepared camera. Further, the position of the user of the PC 1 may be detected with a transmitter or an RFID tag carried with the user of the PC 1.

The controller 101 causes the projector 4 to project the storing button with the timer 11c onto a range where the storing button with the timer 11c does not overlap with the object 9 and is in the vicinity of the user of the PC 1, based on the detected position of the user of the PC 1 and the detected position of the object 9 (step S85). Specifically, the controller 101 causes the projector 4 to project the storing button with the timer 11c onto an area except for a linear area linking the user of the PC 1 to the object 9 and existing between the user of the PC 1 and the object 9, based on the detected position of the user of the PC 1 and the detected position of the object 9. More preferably, the controller 101 causes the projector 4 to project the storing button with the timer 11c onto a predetermined range where the hand of the user of the PC 1 reaches, e.g. the predetermined range that is around 30-50 centimeters away from the user of the PC 1. The predetermined range is in the area except for the linear area linking the user of the PC 1 to the object 9 and existing between the user of the PC 1 and the object 9.

The linear area linking the user of the PC 1 to the object 9 and existing between the user of the PC 1 and the object 9 is excepted from a projection position of the storing button with the timer 11c. This prevents the storing process in which the user of the PC 1 does not intend from being executed when the storing button with the timer 11c is interrupted by operation other than storing the captured image.

Next, the controller 101 compares the taken-in image with the previous taken-in image, i.e., compares the captured still image with the previous captured still image, and determines whether there is a shielding in a projection range of the storing button with the timer 11c (step S86).

When the answer to the determination of step S86 is YES, the controller 101 sets the timer flag to ON and an initial value (e.g. 5 seconds) as the remaining time (step S87). The initial value can be freely set with the operating unit 204. The controller 101 causes the projector 4 to project the remaining time beside the storing button with the timer 11c (step S88). At this time, the remainder time below a decimal point is truncated. Then, the controller 101 reduces elapsed time from the remaining time (step S89), and the process proceeds to step S8 in FIG. 4. When the answer to the determination of step S86 is NO, the process proceeds to step S88.

When the answer to the determination of step S82 is NO, the controller 101 determines whether the remaining time is equal to or less than 0 seconds (step S90). When the answer to the determination of step S90 is NO, the process proceeds to step S88. When the answer to the determination of step S90 is YES, the controller 101 sets the storing flag to ON (step S91) and eliminates display of the storing button with the timer 11c and the remaining time (step S92), and the process proceeds to step S8 in FIG. 4.

As described in detail above, according to the third exemplary embodiment, the controller 101 causes the projector 4 to project the storing button with the timer 11c, which is an indication storing the captured image after preset time has elapsed, onto the area except for the linear area linking the user of the PC 1 to the object 9 and existing between the user of the PC 1 and the object 9, based on the detected position of the user of the PC 1 and the detected position of the object 9. When the storing button with the timer 11c projected by the projector 4 has been interrupted, the controller 101 stores the image captured by the first camera 5 after the preset time has elapsed in the memory 103. It is therefore possible to store the captured image after the preset time has elapsed.

Since during elapse of the preset time, the remaining time is projected beside the storing button with the timer 11c or output from the speaker 8 by voice, the user of the PC 1 can know the remaining time. Further, since during elapse of the preset time, the remaining time is displayed beside the storing button with the timer 11c in the display area 15 of the UI 16 or output from the speaker 19 by voice, the user of the PC 2 can know the remaining time.

Although in the above-mentioned first to third exemplary embodiments, the image captured by the first camera 5 is stored, the above description of the first to third exemplary embodiments may be applied to storage of the image captured by the second camera 6 or the images captured by the first camera 5 and the second camera 6.

Although in the above-mentioned first to third exemplary embodiments, the controller 101 detects the position of the storing button 11, the sequence capture button 11a, the sequence capture completion button 11b, or the storing button with the timer 11c, the user of the PC 2 may decide the position of the storing button 11, the sequence capture button 11a, the sequence capture completion button 11b, or the storing button with the timer 11c on the UI 16. In this case, the controller 101 receives coordinate information of the position of the storing button 11, the sequence capture button 11a, the sequence capture completion button 11b, or the storing button with the timer 11c decided by the PC 2, and information of the type of the button. And then, the controller 101 causes the projector 4 to project a corresponding button based on these information.

In the above-mentioned first to third exemplary embodiments, when the controller 101 stores the captured image, the attribute information thereof, and the recording file in the memory 103, a storage area of the memory 103 may be replaced with another storage area thereof for each user of the PC 1.

A recording medium on which the software program for realizing the functions of the PC 1 and the PC 2 is recorded may be supplied to each PC, and the CPU of each PC may read and execute the program recorded on the recording medium. In this manner, the same effects as those of the above-described first to third exemplary embodiments can be achieved. The recording medium for providing the program may be a CD-ROM, a DVD, or a SD card, for example.

Alternatively, the CPU of each PC may execute a software program for realizing the functions of each PC, so as to achieve the same effects as those of the above-described first to third exemplary embodiments.

It should be noted that the present invention is not limited to those exemplary embodiments, and various modifications may be made to them without departing from the scope of the invention.

What is claimed is:

1. An information processing apparatus which is connected to a projection device projecting an annotation image input from an external terminal onto a projection area including an object, and an image capture device capturing the projection area, comprising:
   an acquiring portion that acquires a plurality of images captured by the image capture device;
   a detecting portion that detects positions of the object and a user of the information processing apparatus from the plurality of images;
   a controller that causes the projection device to project a first indication data indicating storage of at least one of the captured images onto an area except for a linear area linking the user of the information processing apparatus to the object and existing between the user of the information processing apparatus and the object, based on the detected positions of the object and the user of the information processing apparatus, and stores the at least one of the captured images in a memory when the first indication data projected by the projection device has been interrupted.

2. The information processing apparatus according to claim 1, further comprising an output portion that outputs voice input from the external terminal, and an input portion that inputs the output voice and voice generated by the user of the information processing apparatus,
   wherein when the first indication data projected by the projection device has been interrupted, the controller relates voice data input by the input portion during a time period from projection of image captured by the projection device to interrupt of the first indication data to the captured image which should be stored in the memory, and stores the voice data and the captured image in the memory.

3. The information processing apparatus according to claim 1, wherein the controller causes the projection device to project a second indication data, which is an indication storing a plurality of images sequentially captured at regular time intervals, onto the area except for the linear area linking the user of the information processing apparatus to the object and existing between the user of the information processing apparatus and the object, based on the detected positions of the object and the information processing apparatus, and stores the plurality of images sequentially captured at regular time intervals by the image capture device in the memory when the second indication data projected by the projection device has been interrupted.

4. The information processing apparatus according to claim 3, wherein when the second indication data projected by the projection device has been interrupted, the controller causes the projection device to project a third indication data, which is an indication to complete storing the plurality of captured images, at the same position as the second indication data on behalf of the second indication data, and when the third indication data projected by the projection device has been interrupted, the controller completes storing the plurality of captured images in the memory.

5. The information processing apparatus according to claim 1, wherein the controller causes the projection device to project a fourth indication device, which is an indication storing the captured image after preset time has elapsed, onto the area except for the linear area linking the user of the information processing apparatus to the object and existing between the user of the information processing apparatus and the object, based on the detected positions of the object and the information processing apparatus, and stores the image captured by the image capture device after the preset time has elapsed in the memory when the fourth indication device projected by the projection data has been interrupted.

6. The information processing apparatus according to claim 5, wherein during elapse of preset time, remaining time is informed of at least one of the user of the information processing apparatus and a user of the external terminal.

7. A remote indication system comprising:
  a projection device that projects an annotation image input from an external terminal onto a projection area including an object;
  an image capture device that captures the projection area; and
  an information processing apparatus including:
    an acquiring portion that acquires a plurality of images captured by the image capture device;
    a detecting portion that detects positions of the object and a user of the information processing apparatus from the plurality of images;
    a controller that causes the projection device to project a first indication data indicating storage of at least one of the captured images onto an area except for a linear area linking the user of the information processing apparatus to the object and existing between the user of the information processing apparatus and the object, based on the detected positions of the object and the user of the information processing apparatus, and stores the at least one of the captured images in a memory when the first indication data projected by the projection device has been interrupted.

8. A computer readable medium causing a computer to execute a process for processing information, the computer being connected to a projection device projecting an annotation image input from an external terminal onto a projection area including an object, and an image capture device capturing the projection area, the process comprising:
  acquiring a plurality of images captured by the image capture device;
  detecting positions of the object and a user of the information processing apparatus from the plurality of images;
  causing the projection device to project a first indication data indicating storage of at least one of the captured images onto an area except for a linear area linking the user of the information processing apparatus to the object and existing between the user of the information processing apparatus and the object, based on the detected positions of the object and the user of the information processing apparatus; and
  storing the at least one of the captured images in a memory when the first indication data projected by the projection device has been interrupted.

* * * * *